United States Patent
Ootsuka

(10) Patent No.: US 9,689,429 B2
(45) Date of Patent: Jun. 27, 2017

(54) METHOD OF MANUFACTURING SHELL TYPE NEEDLE ROLLER BEARING AND MANUFACTURING JIG USED FOR MANUFACTURING THEREOF

(71) Applicant: NSK LTD., Tokyo (JP)

(72) Inventor: Tomohiro Ootsuka, Takasaki (JP)

(73) Assignee: NSK LTD., Toyko (JP)

( * ) Notice: Subject to any disclaimer, the term of this patent is extended or adjusted under 35 U.S.C. 154(b) by 0 days.

(21) Appl. No.: 14/913,874

(22) PCT Filed: Dec. 13, 2013

(86) PCT No.: PCT/JP2013/083464
§ 371 (c)(1),
(2) Date: Feb. 23, 2016

(87) PCT Pub. No.: WO2015/029271
PCT Pub. Date: Mar. 5, 2015

(65) Prior Publication Data
US 2016/0208855 A1 Jul. 21, 2016

(30) Foreign Application Priority Data

Aug. 26, 2013 (JP) ................................. 2013-174526

(51) Int. Cl.
*F16C 33/64* (2006.01)
*F16C 43/06* (2006.01)
(Continued)

(52) U.S. Cl.
CPC ................ *F16C 33/64* (2013.01); *C21D 1/06* (2013.01); *C21D 9/40* (2013.01); *F16C 19/466* (2013.01);
(Continued)

(58) Field of Classification Search
CPC ......... F16C 19/466; F16C 33/54; F16C 33/64
See application file for complete search history.

(56) References Cited

U.S. PATENT DOCUMENTS

| | | | | |
|---|---|---|---|---|
| 2,368,175 A | * | 1/1945 | Thomas | .................. F16C 19/48 |
| | | | | 29/898.063 |
| 3,054,164 A | * | 9/1962 | Recknagel | ............ F16C 43/086 |
| | | | | 29/898.062 |

(Continued)

FOREIGN PATENT DOCUMENTS

| | | |
|---|---|---|
| CN | 102224350 A | 10/2011 |
| JP | 40-17322 B1 | 8/1965 |

(Continued)

OTHER PUBLICATIONS

Written Opinion issued on Jan. 28, 2014 by the International Searching Authority in related Application No. PCT/JP2013/083464, (PCT/ISA/237).

(Continued)

*Primary Examiner* — Jacob Cigna
(74) *Attorney, Agent, or Firm* — Sughrue Mion, PLLC

(57) ABSTRACT

According to a method of assembling a shell type needle roller bearing 10, after both flange portions 11b and 11c of a shell outer ring 11 are formed and a heat treatment 5 is applied to the shell outer ring 11, and either a retainer 13 or a retainer 18 and needles 12 are assembled with the shell outer ring 11, and thus a plating step in the related art is not required. In addition, the retainers 13 and 18 are not thermally affected by the heat treatment, and thus a resin material can be used as the material of the retainers 13 and 18.

1 Claim, 12 Drawing Sheets

(51) Int. Cl.
*F16C 19/46* (2006.01)
*F16C 33/46* (2006.01)
*F16C 43/04* (2006.01)
*C21D 1/06* (2006.01)
*C21D 9/40* (2006.01)
*F16C 43/08* (2006.01)

(52) U.S. Cl.
CPC .......... *F16C 33/4635* (2013.01); *F16C 43/04* (2013.01); *F16C 43/06* (2013.01); *F16C 33/4676* (2013.01); *F16C 43/065* (2013.01); *F16C 43/08* (2013.01)

(56) References Cited

U.S. PATENT DOCUMENTS

| | | | | |
|---|---|---|---|---|
| 5,848,846 | A * | 12/1998 | Sugiyama | F16C 19/466 29/898.061 |
| 7,390,127 | B2 * | 6/2008 | Kono | F16C 33/4611 384/526 |
| 7,766,555 | B2 * | 8/2010 | Kono | F16C 19/26 384/560 |
| 8,628,251 | B2 * | 1/2014 | Kondou | F16C 19/466 384/572 |
| 2005/0185875 | A1 * | 8/2005 | Kono | F16C 19/26 384/577 |
| 2006/0104560 | A1 * | 5/2006 | Kono | F16C 33/4611 384/572 |
| 2011/0249928 | A1 * | 10/2011 | Kondou | F16C 19/466 384/569 |

FOREIGN PATENT DOCUMENTS

| | | |
|---|---|---|
| JP | 43-9601 B1 | 4/1968 |
| JP | 11-303863 A | 11/1999 |
| JP | 2002-139067 A | 5/2002 |
| JP | 2002-364652 A | 12/2002 |
| JP | 2004-211825 A | 7/2004 |
| JP | 2005-163904 A | 6/2005 |
| JP | 2005-163994 A | 6/2005 |
| JP | 2006-57707 A | 3/2006 |
| JP | 2012-117582 A | 6/2012 |

OTHER PUBLICATIONS

Search Report issued on Jan. 28, 2014 by the International Searching Authority in related Application No. PCT/JP2013/083464, (PCT/ISA/210).
Office Action issued Mar. 16, 2017 by the State Intellectual Property Office of P.R. China in counterpart Chinese Patent Application No. 201380079132.1.

* cited by examiner

FIG. 7A
FIG. 7B
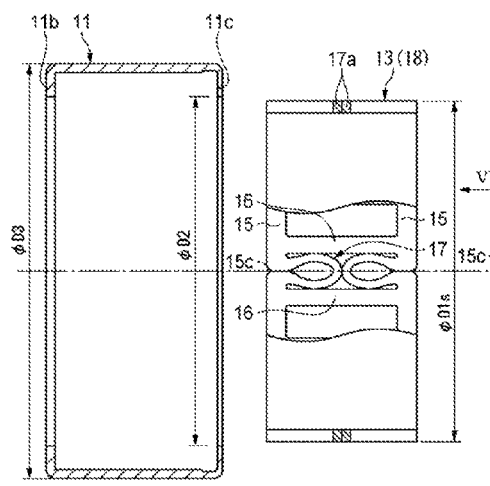
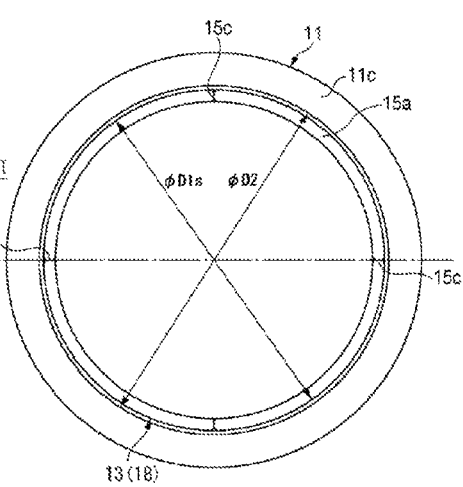

PRIOR ART

METHOD OF MANUFACTURING SHELL TYPE NEEDLE ROLLER BEARING AND MANUFACTURING JIG USED FOR MANUFACTURING THEREOF

TECHNICAL FIELD

The present invention relates to a method of manufacturing a shell type needle roller bearing and a manufacturing jig used for the manufacturing thereof, and particularly, to a method of manufacturing a shell type needle roller bearing used in rotation support portions of various pieces of machinery, and a manufacturing jig used for the manufacturing thereof.

BACKGROUND ART

In recent years, instead of a slide bearing (bush), a shell type needle roller bearing having the same sectional height as the slide bearing is used in portions, which receive a radial load, of an automatic transmission and the like of an automobile. As illustrated in FIG. 15, a shell type needle roller bearing 100 includes a shell outer ring 101 having an inner circumferential raceway surface 101a and a pair of flange portions 101b and 101c in both end portions of the shell outer ring 101; a plurality of needles 102 that are disposed in the shell outer ring 101 in such a way as to be capable of rolling along the raceway surface 101a; and a retainer 103 having a plurality of pockets for retaining the plurality of needles 102.

In a step of forming the shell outer ring 101 according to a method of manufacturing the shell type needle roller bearing 100 in the related art, one flange portion 101b is formed by processing a typical cold rolled steel sheet (for example, which is made of low carbon steel such as SPCC) into the shape of a cup by deep drawing, and blanking a bottom surface. Plating such as copper plating is applied to edge portions on axial opening sides of the shell outer ring 101, and a heat treatment such as a carburizing treatment or a carbonitriding treatment is applied to the shell outer ring 101. Thereafter, the needles 102 and the retainer 103 are assembled with the shell outer ring 101, the plating of which is peeled off, and the flange portion 101c is formed by bending the edge portions on the axial opening sides of the shell outer ring 101. As a result, the shell type needle roller bearing 100 is manufactured.

When the plating step, the heat treatment step, the plating peeling off step, and the assembly/press step are sequentially performed after the press step, it is difficult to set these steps on the same line. This manufacturing method has a problem in that not only is the number of steps large, a large amount of process time is required, or an equipment cost is high, but also transportation between the steps and the like has to be taken into consideration. In addition, the manufacturing method has a problem in that various chemical agents have to be used to peel the plating off.

Patent Document 1 discloses hot curling technology by which bending is performed while heating the flange portion 101c using high frequency electricity so as to eliminate the plating step.

Patent Document 2 discloses technology by which the shell type needle roller bearing is assembled without a heat treatment being applied thereto, and a carburizing treatment is applied to the entirety of the assembled shell type needle roller bearing at the final stage.

PRIOR ART DOCUMENT

Patent Document

Patent Document 1: JP-A-11-303863
Patent Document 2: JP-A-2002-139067

SUMMARY OF THE INVENTION

Problem to be Solved

According to the technology disclosed in Citations 1 and 2, a heat treatment is applied to the shell outer ring 101 after configuration elements are assembled with the shell outer ring 101, and thus it is not possible to use a resin retainer that is weak to heat. For this reason, when the resin retainer is used, it is not possible to select the manufacturing method including the plating step in the related art.

The present invention is made in light of these problems, and an object of the present invention is to provide a method of manufacturing a shell type needle roller bearing with a resin retainer which can be manufactured by a manufacturing method not requiring a plating step, and a manufacturing jig used for the manufacturing thereof.

Means for Solving the Problem (1) A method of manufacturing a shell type needle roller bearing including a shell outer ring having an inner circumferential raceway surface and a pair of inward flange portions in both end portions of the shell outer ring; a plurality of needles that are disposed in the shell outer ring in such a way as to be capable of rolling along the raceway surface of the shell outer ring; and a retainer having a plurality of pockets for retaining the plurality of needles, wherein the diameter of the retainer can be reduced,
wherein after both the flange portions of the shell outer ring are formed and a heat treatment is applied to the shell outer ring, the diameter of the retainer having the plurality of needles assembled therewith is reduced to a diameter smaller than a flange-portion inner diameter of the shell outer ring and the retainer is inserted into the shell outer ring using a retainer insertion jig,
wherein the retainer insertion jig is formed of a female jig and a male jig,
wherein a shell outer ring-mounting stepped portion, in which the shell outer ring can be mounted, is provided at one axial end of the female jig, has a diameter greater than the outer diameter of the shell outer ring, and is axially concave,
wherein a retainer-mounting stepped portion, in which the retainer can be mounted while being assembled with the plurality of needles, is provided at the other axial end of the female jig, is coaxial with the shell outer ring-mounting stepped portion, has a diameter greater than the maximum outer diameter of the retainer with which the plurality of needles are assembled, and is axially concave,
wherein a small-diameter hole is provided on an inside end surface of the shell outer ring-mounting stepped portion, is coaxial with the shell outer ring-mounting stepped portion, and has a diameter smaller than the flange-portion inner diameter of the shell outer ring,
wherein the small-diameter hole is gradually connected to the retainer-mounting stepped portion via a reduced diameter hole with a tapered shape, the diameter of which increases from the small-diameter hole toward the retainer-mounting stepped portion, wherein the male jig includes a body portion which has a diameter smaller than that of the small-diameter hole of the female jig such that the body portion can be inserted into the small-diameter hole, and a retainer mounting portion that is coaxial with the body portion, protrudes in an axial direction while being adjacent to the body portion, and has a diameter that is smaller than a diameter obtained by subtracting two times the outer diameter of the needle from the diameter of the small-diameter hole, wherein a stepped portion between the body portion and the retainer mounting portion serves as a retainer pressing portion that is a flat surface perpendicular to the axis, and wherein when the retainer is inserted into the shell outer ring, the shell outer ring is mounted in the shell outer ring-mounting stepped portion of the female jig, the retainer having the plurality of needles assembled therewith is mounted in the retainer mounting portion of the male jig, or in the retainer-mounting stepped portion of the female jig, and the male jig is inserted into the female jig from the retainer-mounting stepped portion side of the female jig, and thus the retainer having the plurality of needles assembled therewith is inserted into the shell outer ring.

(2) A method of manufacturing a shell type needle roller bearing including a shell outer ring having an inner circumferential raceway surface and a pair of inward flange portions in both end portions of the shell outer ring; a plurality of needles that are disposed in the shell outer ring in such a way as to be capable of rolling along the raceway surface of the shell outer ring; and a retainer having a plurality of pockets for retaining the plurality of needles, wherein the diameter of the retainer can be reduced, wherein after both the flange portions of the shell outer ring are formed and a heat treatment is applied to the shell outer ring, the diameter of the retainer is reduced to a diameter smaller than a flange-portion inner diameter of the shell outer ring, the retainer is inserted into the shell outer ring using a retainer insertion jig, and then the plurality of needles are respectively inserted into the pockets of the retainer, wherein the retainer insertion jig is formed of a female jig and a male jig, wherein a shell outer ring-mounting stepped portion, in which the shell outer ring can be mounted, is provided at one axial end of the female jig, has a diameter greater than the outer diameter of the shell outer ring, and is axially concave, wherein a retainer-mounting stepped portion, in which the retainer can be mounted, is provided at the other axial end of the female jig, is coaxial with the shell outer ring-mounting stepped portion, has a diameter greater than the outer diameter of the retainer, and is axially concave, wherein a small-diameter hole is provided on an inside end surface of the shell outer ring-mounting stepped portion, is coaxial with the shell outer ring-mounting stepped portion, and has a diameter smaller than the flange-portion inner diameter of the shell outer ring, wherein the small-diameter hole is gradually connected to the retainer-mounting stepped portion via a reduced diameter hole with a tapered shape, the diameter of which increases from the small-diameter hole toward the retainer-mounting stepped portion, wherein the male jig includes a body portion which has a diameter smaller than that of the small-diameter hole of the female jig such that the body portion can be inserted into the small-diameter hole, and a retainer mounting portion that is coaxial with the body portion, protrudes in an axial direction while being adjacent to the body portion, and has a diameter that is smaller than a diameter obtained by subtracting two times the radial thickness of the retainer from the diameter of the small-diameter hole, wherein a stepped portion between the body portion and the retainer mounting portion serves as a retainer pressing portion that is a flat surface perpendicular to the axis, and wherein when the retainer is inserted into the shell outer ring, the shell outer ring is mounted in the shell outer ring-mounting stepped portion of the female jig, the retainer is mounted in the retainer mounting portion of the male jig, or in the retainer-mounting stepped portion of the female jig, and the male jig is inserted into the female jig from the retainer-mounting stepped portion side of the female jig, and thus the retainer is inserted into the shell outer ring.

(3) A manufacturing jig used to manufacture a shell type needle roller bearing including a shell outer ring having an inner circumferential raceway surface and a pair of inward flange portions in both end portions of the shell outer ring; a plurality of needles that are disposed in the shell outer ring in such a way as to be capable of rolling along the raceway surface of the shell outer ring; and a retainer having a plurality of pockets for retaining the plurality of needles, wherein the manufacturing jig is formed of a female jig and a male jig, wherein a shell outer ring-mounting stepped portion, in which the shell outer ring can be mounted, is provided at one axial end of the female jig, has a diameter greater than the outer diameter of the shell outer ring, and is axially concave, wherein a retainer-mounting stepped portion, in which the retainer can be mounted while being assembled with the plurality of needles, is provided at the other axial end of the female jig, is coaxial with the shell outer ring-mounting stepped portion, has a diameter greater than the maximum outer diameter of the retainer with which the plurality of needles are assembled, and is axially concave, wherein a small-diameter hole is provided on an inside end surface of the shell outer ring-mounting stepped portion, is coaxial with the shell outer ring-mounting stepped portion, and has a diameter smaller than a flange-portion inner diameter of the shell outer ring, wherein the small-diameter hole is gradually connected to the retainer-mounting stepped portion via a reduced diameter hole with a tapered shape, the diameter of which increases from the small-diameter hole toward the retainer-mounting stepped portion, wherein the male jig includes a body portion which has a diameter smaller than that of the small-diameter hole of the female jig such that the body portion can be inserted into the small-diameter hole, and a retainer mounting portion that is coaxial with the body portion, protrudes in an axial direction while being adjacent to the body portion, and has a diameter that is smaller than a diameter obtained by subtracting two times the outer diameter of the needle from the diameter of the small-diameter hole, and wherein a stepped portion between the body portion and the retainer mounting portion serves as a retainer pressing portion that is a flat surface perpendicular to the axis.

(4) A manufacturing jig used to manufacture a shell type needle roller bearing including a shell outer ring having an inner circumferential raceway surface and a pair of inward flange portions in both end portions of the shell outer ring; a plurality of needles that are disposed in the shell outer ring in such a way as to be capable of rolling along the raceway surface of the shell outer ring; and a retainer having a plurality of pockets for retaining the plurality of needles, wherein the manufacturing jig is formed of a female jig and a male jig, wherein a shell outer ring-mounting stepped portion, in which the shell outer ring can be mounted, is provided at one axial end of the female jig, has a diameter greater than the outer diameter of the shell outer ring, and is axially concave, wherein a retainer-mounting stepped portion, in which the retainer can be mounted, is provided at the other axial end of the female jig, is coaxial with the shell outer ring-mounting stepped portion, has a diameter greater than the outer diameter of the retainer, and is axially concave, wherein a small-diameter hole is provided on an inside end surface of the shell outer ring-mounting stepped portion, is coaxial with the shell outer ring-mounting stepped portion, and has a diameter smaller than a flange-portion inner diameter of the shell outer ring, wherein the small-diameter hole is gradually connected to the retainer-mounting stepped portion via a reduced diameter hole with a tapered shape, the diameter of which increases from the small-diameter hole toward the retainer-mounting stepped portion, wherein the male jig includes a body portion which has a diameter smaller than that of the small-diameter hole of the female jig such that the body portion can be inserted into the small-diameter hole, and a retainer mounting portion that is coaxial with the body portion, protrudes in an axial direction while being adjacent to the body portion, and has a diameter that is smaller than a diameter obtained by subtracting two times the radial thickness of the retainer from the diameter of the small-diameter hole, and wherein a stepped portion between the body portion and the retainer mounting portion serves as a retainer pressing portion that is a flat surface perpendicular to the axis.

Effects of Invention

According to the method of manufacturing a shell type needle roller bearing and a manufacturing jig used for the manufacturing thereof in the present invention, after both the flange portions of the shell outer ring are formed and a heat treatment is applied to the shell outer ring, the retainer and the needles are assembled with the shell outer ring, and thus a plating step, which has been required in the related art, is not required, and the retainer is not thermally affected by the heat treatment. Therefore, resin can be used as the material of the retainer.

BRIEF DESCRIPTION OF DRAWINGS

FIG. 7A illustrates sectional views of the retainer and the shell which are elastically deformed, and FIG. 7B is a side view when the retainer and the shell are seen in a direction of arrow VI in FIG. 7A.

FIG. 9 shows views illustrating a state in which the shell outer ring and the retainer are respectively mounted on the retainer insertion jigs.

FIG. 13 shows views illustrating a state in which the shell outer ring and the retainer having the needles assembled therewith are respectively mounted on the retainer insertion jigs.

DESCRIPTION OF EMBODIMENTS

Hereinafter, a shell type needle roller bearing in an embodiment of the present invention will be described with reference to the accompanying drawings.

Figure 1:
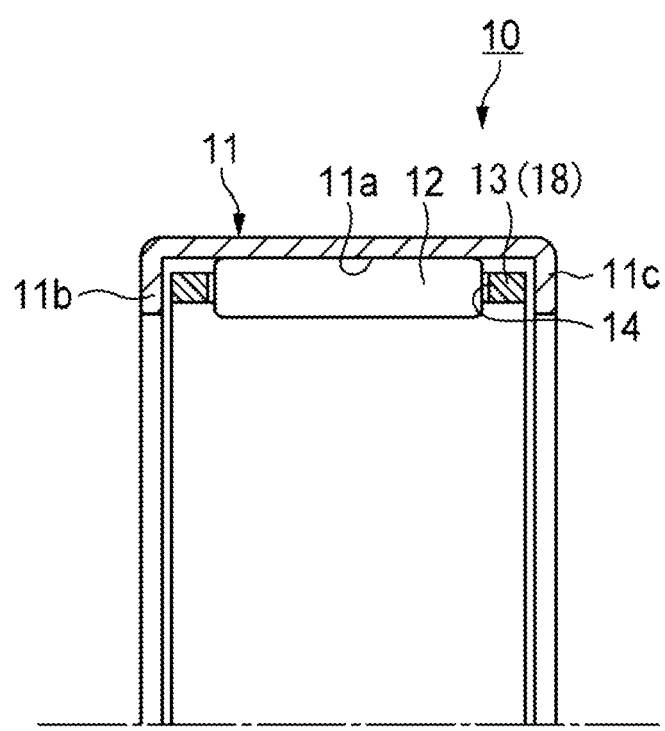
FIG. 1 is a sectional view of a shell type needle roller bearing in an embodiment of the present invention.

As illustrated in FIG. 1, a shell type needle roller bearing 10 includes a shell outer ring 11 having an inner circumferential raceway surface 11a and a pair of inward flange portions 11b and 11c in both end portions of the shell outer ring 11; a plurality of needles 12 that are disposed in the shell outer ring 11 in such a way as to be capable of rolling along the raceway surface 11a of the shell outer ring 11; and a retainer 13 having a plurality of pockets 14 for retaining the plurality of needles 12. A shaft (or an inner ring member) (not illustrated) is rotatably supported by the shell type needle roller bearing 10.

The shell outer ring 11 is manufactured by the plastic working (for example, deep drawing) of a cold rolled steel sheet (for example, which is made of low carbon steel such as SPCC) or the like such that the pair of flange portions 11b and 11c is bent and formed in both end portions of the shell outer ring 11 with a cylindrical shape in its entirety. The shell outer ring 11 is hardened by a heat treatment such as a carburizing treatment or a carbonitriding treatment.

Before the needles 12 and the retainer 13 are assembled with the shell outer ring 11, the flange portions 11b and 11c are formed in the shell outer ring 11, and the shell outer ring 11 is hardened by a heat treatment. For this reason, unlike the flange 101c of the shell outer ring 101 in the related art, it is not necessary to set the flange portions 11b and 11c to have a thickness required for easy bending at a later stage, and thus it is possible to form the flange portions 11b and 11c in the same shape, and the shell outer ring 11 can be independent of orientation. The shell outer ring 11 can also be formed by cutting a thick steel sheet instead of the plastic working of a thin steel sheet.

Figure 2:
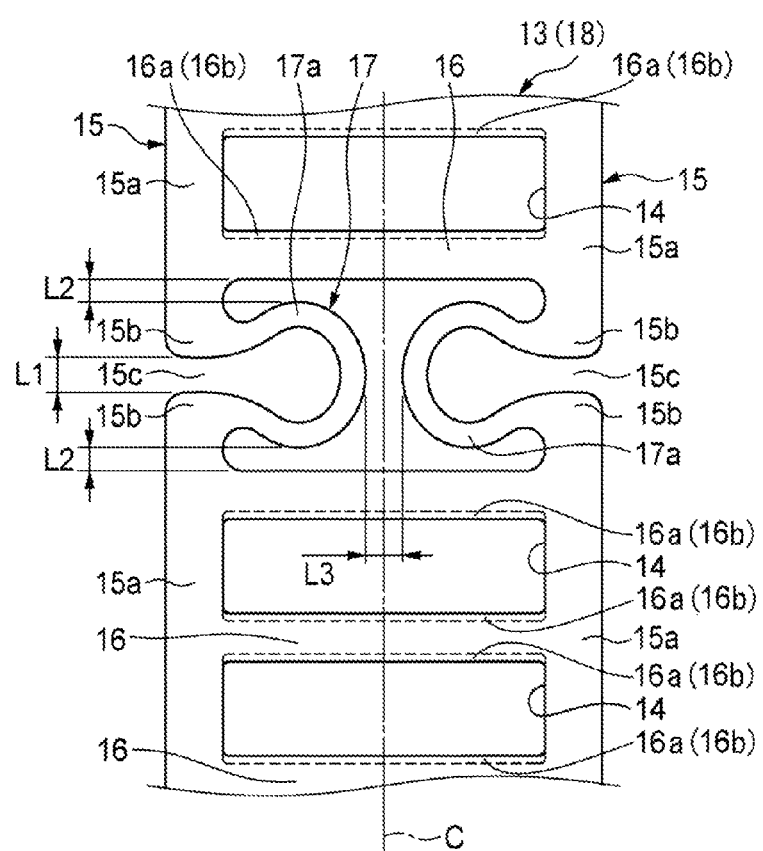
FIG. 2 is an enlarged top view illustrating a portion of a retainer.

As illustrated in FIG. 2, the retainer 13 includes a pair of coaxially disposed rim portions 15, 15, and a plurality of columnar portions 16 that connect the pair of rim portions 15, 15 together in an axial direction. Each of the pair of rim portions 15, 15 is formed of a plurality (four in the embodiment) of arc-shaped portions 15a. A plurality of slits 15c are formed in the rim portions 15, 15 while being positioned at the same circumferential phase, and each of the slits 15c is formed between end portions 15b, 15b of the arc-shaped portions 15a that are circumferentially adjacent to each other. A large number of the slits 15c decrease the number of needles 12, and thus, preferably, the number of slits 15c is two to six.

A plurality of elastic deformable portions 17 are circumferentially provided in the retainer 13 such that the retainer 13 (the slits 15c) is allowed to circumferentially contract, and each of the elastic deformable portions 17 is provided in a region between the columnar portions 16, 16 that are circumferentially adjacent to each other, with the slits 15c being formed in the region.

Figure 3:
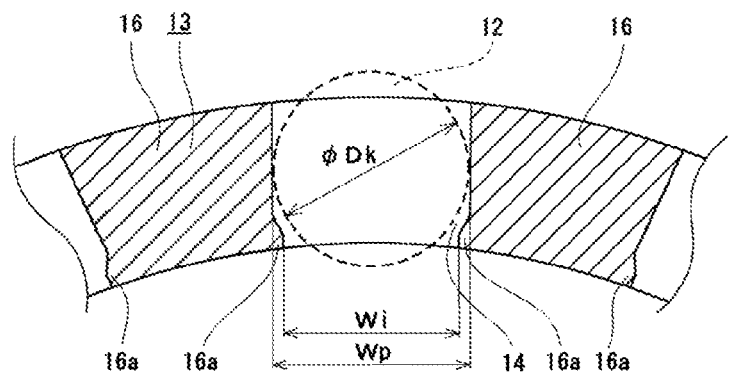
FIG. 3 is an axial sectional view of the retainer.

Each of the pockets 14, 14 is formed by a rectangular space, the circumference of which is surrounded by facing inner surfaces of the pair of rim portions 15, 15, and both circumferential side surfaces of the columnar portions 16, 16 that are circumferentially adjacent to each other without the elastic deformable portion 17 being interposed therebetween. As illustrated in FIG. 3, radially inside locking protrusions 16a, 16a are respectively formed in diametrical inner end portions of the retainer 13 and on both the circumferential side surfaces of the columnar portions 16, 16 over the entire length of the columnar portions 16, 16.

The elastic deformable portion 17 includes a pair of elastic deformable pieces 17a, 17a, portions of which respectively extend axially inwards from end portions (base end portions) 15b, 15b of the arc-shaped portions 15a, 15a circumferentially adjacent to each other, and the extended portions of which are connected together in the circumferential direction. The pair of elastic deformable pieces 17a, 17a has the same shape, and the elastic deformable portion 17 is formed symmetrical relative to an axial center portion C of the retainer 13.

Figure 4:
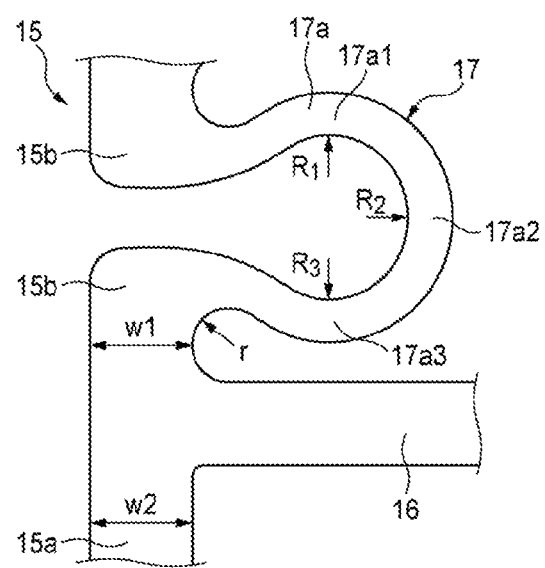
FIG. 4 is an enlarged top view illustrating main parts in FIG. 2.

As illustrated in an enlarged manner in FIG. 4, the elastic deformable piece 17a is formed of a plurality of arcs 17a1, 17a2, and 17a3 which respectively have radii of curvature R1 to R3. The elastic deformable piece 17a may be formed of a single arc.

When the strength of a base end portion is taken into consideration, an axial width w1 of the end portion (which is the base end portion of the elastic deformable portion 17) 15b of the arc-shaped portion 15a is preferably greater than or equal to an axial width w2 of the arc-shaped portion 15a. An arc surface, which is formed on an axial inner surface of the base end portion, preferably has a large curvature (radius of curvature r is preferably small).

Figure 5:
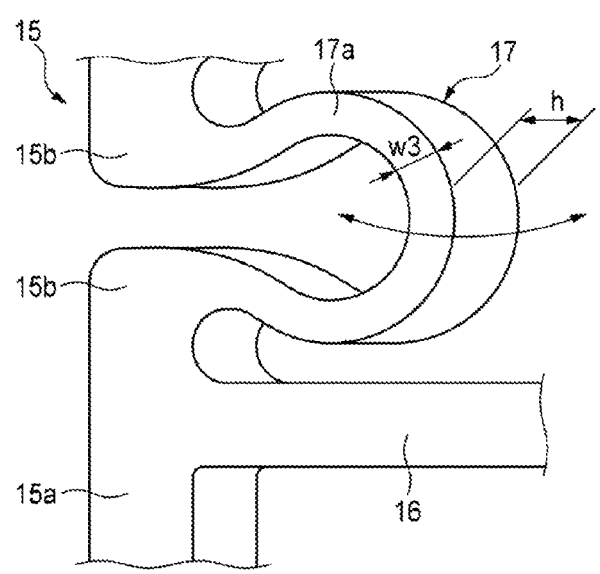
FIG. 5 is a view illustrating the radial deformation of an elastic deformable portion.

As illustrated in FIG. 5, a radial thickness h of the elastic deformable piece 17a is set to be greater than a width w3 of the elastic deformable piece 17a, and thus it is possible to restrict the elastic deformable piece 17a from being radially deformed as illustrated by the arrow.

Hereinafter, a method (manufacturing method) of assembling the retainer 13 with the aforementioned configuration into the shell outer ring 11 will be described.

Figure 6A:
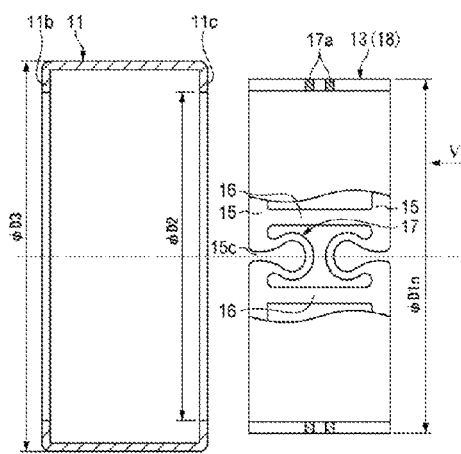
FIG. 6A illustrates sectional views of the retainer and a shell which are not yet elastically deformed.
Figure 6B:
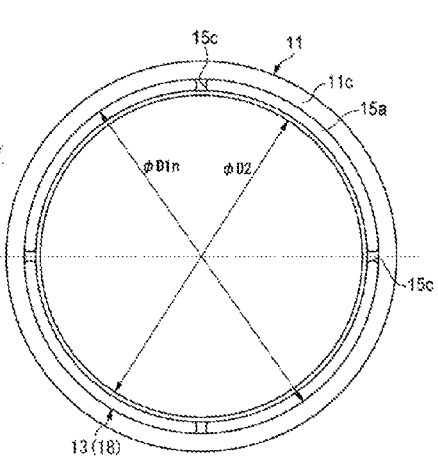
FIG. 6B is a side view when the retainer and the shell are seen in a direction of arrow V in FIG. 6A.

FIG. 6A illustrates sectional views of the retainer 13 and the shell outer ring 11 which are not yet elastically deformed, and FIG. 6B is a side view when the retainer 13 and the shell outer ring 11 are seen in a direction of arrow V in FIG. 6A. FIG. 7A illustrates sectional views of the retainer 13 and the shell outer ring 11 which are elastically deformed, and FIG. 7B is a side view when the retainer 13 and the shell outer ring 11 are seen in a direction of arrow VI in FIG. 7A.

An outer diameter φD1n of the retainer 13 is greater than an inner diameter (hereinafter, which is referred to as a flange-portion inner diameter) φD2 of the pair of inward flange portions 11b and 11c of the shell outer ring 11 (φD1n>φD2). A circumferential distance L1 (refer to FIG. 2) of each of the slits 15c is reduced by deforming the elastic deformable portion 17, and as a result, the diameter of the retainer 13 can be circumferentially reduced. Accordingly, as illustrated in FIG. 6, the diameter of the retainer 13 can be reduced up to an outer diameter φD1s that is smaller than the flange-portion inner diameter φD2 of the shell outer ring 11 (φD2>φD1s). A relationship between the sum of the outer circumferential length of the retainer 13 and the circumferential distances L1 of the slits 15c and the inner circumferential length of the inward flange portions 11b and 11c of the shell outer ring 11 is substantially represented by an expression hereinbelow.

$$\pi \cdot \phi D1n - L1 \times (\text{the number of slits}) < \pi \cdot \phi D2$$

The movable range of the elastic deformable piece 17a, that is, the amount of deformation of the elastic deformable piece 17a can be arbitrarily set by using an axial distance L3 (refer to FIG. 2) between the pair of elastic deformable pieces 17a, 17a, and the circumferential distance L1 of the slit 15c. The circumferential distance L1 of the slit 15c which is not yet elastically deformed is set to be smaller than the sum of the circumferential distances L2, L2 between the columnar portions 16 and the elastic deformable pieces 17a adjacent to each other in such a way that the columnar portion 16 is prevented from coming into contact with the elastic deformable piece 17a before the slit 15c disappears (L1<2× L2).

The outer diameter of the retainer 13 is reduced until becoming smaller than the flange-portion inner diameter φD2 of the shell outer ring 11, and the retainer 13 is inserted into the shell outer ring 11. After the insertion, the elastic deformable portions 17 are restored to the original state, and as a result, the retainer 13 is accommodated in the shell outer ring 11.

Figure 8:
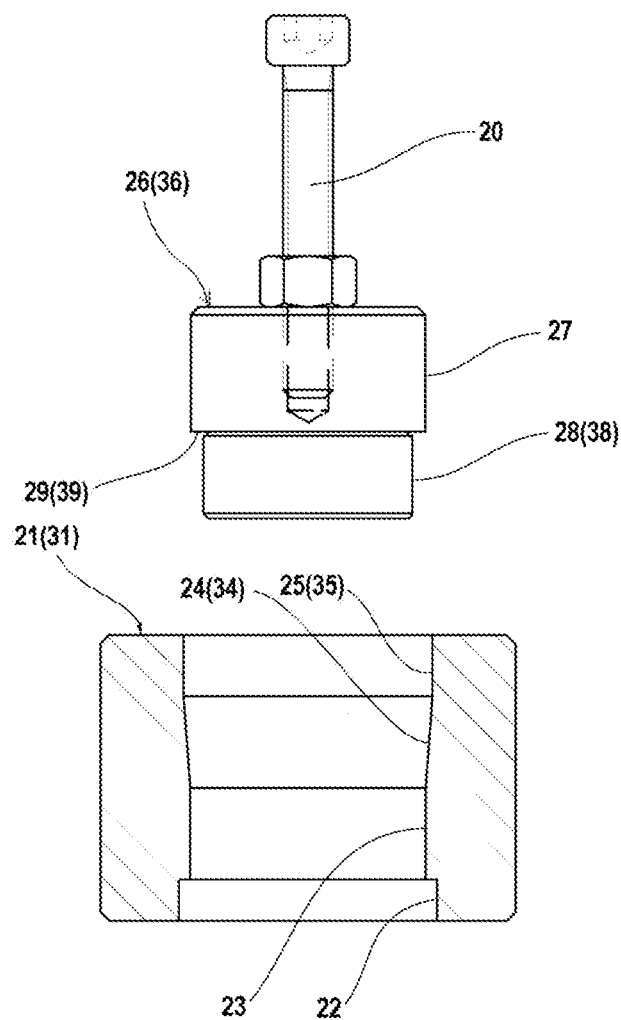
FIG. 8 is a view illustrating retainer insertion jigs.

As illustrated in FIG. 8, retainer insertion jigs formed of a female jig 21 and a male jig 26 are used to reduce the diameter of the retainer 13 and to insert the retainer 13 into the shell outer ring 11.

A shell outer ring-mounting stepped portion 22, in which the shell outer ring 11 can be mounted, is provided at one axial end (lower end in FIG. 8) of the female jig 21. The shell outer ring-mounting stepped portion 22 has a diameter slightly greater than an outer diameter φ3 of the shell outer ring 11, and is axially concave. A retainer-mounting stepped portion 25, in which the retainer 13 can be mounted, is provided at the other axial end (upper end in FIG. 8) of the female jig 21. The retainer-mounting stepped portion 25 is coaxial with the shell outer ring-mounting stepped portion 22, has a diameter slightly greater than the outer diameter ϕD1n of the retainer 13, and is axially concave. A small-diameter hole 23 is provided on an inside end surface of the shell outer ring-mounting stepped portion 22. The small-diameter hole 23 is coaxial with the shell outer ring-mounting stepped portion 22, and has a diameter smaller than the flange-portion inner diameter ϕD2 of the shell outer ring 11. The small-diameter hole 23 is gradually connected to the retainer-mounting stepped portion 25 via a reduced diameter hole 24 with a tapered shape, the diameter of which increases from the small-diameter hole 23 toward the retainer-mounting stepped portion 25.

The male jig 26 includes a cylindrical body portion 27, and a cylindrical retainer mounting portion 28 that is coaxial with the body portion 27, and protrudes toward one end side (lower side in FIG. 8) in the axial direction while being adjacent to the body portion 27. The body portion 27 is set to have a diameter slightly smaller than the small-diameter hole 23 of the female jig 21, and the body portion 27 can be inserted into the small-diameter hole 23. The retainer mounting portion 28 is formed to have a diameter that is slightly smaller than a diameter obtained by subtracting two times the radial thickness h (refer to FIG. 5) of the retainer 13 from the diameter of the small-diameter hole 23. A stepped portion between the body portion 27 and the retainer mounting portion 28 serves as a retainer pressing portion 29 that is a flat surface perpendicular to the axial direction (flat surface perpendicular to the axis). A pressing shaft 20 is provided on the body portion 27 side (the other end side in the axial direction and the upper side in FIG. 8) of the male jig 26, with the body portion 27 side being opposite to the retainer mounting portion 28. When the male jig 26 is inserted into the female jig 21, the pressing shaft 20 transmits an axial pressing force from a hand or a machine toward the male jig 26. The shape of the pressing shaft 20 may be selected so as to allow the pressing shaft 20 to be easily gripped by an operator, or to be easily attached to a machine, and the pressing shaft 20 does not necessarily have the shape illustrated in FIG. 8.

Figures 9A, 9B:
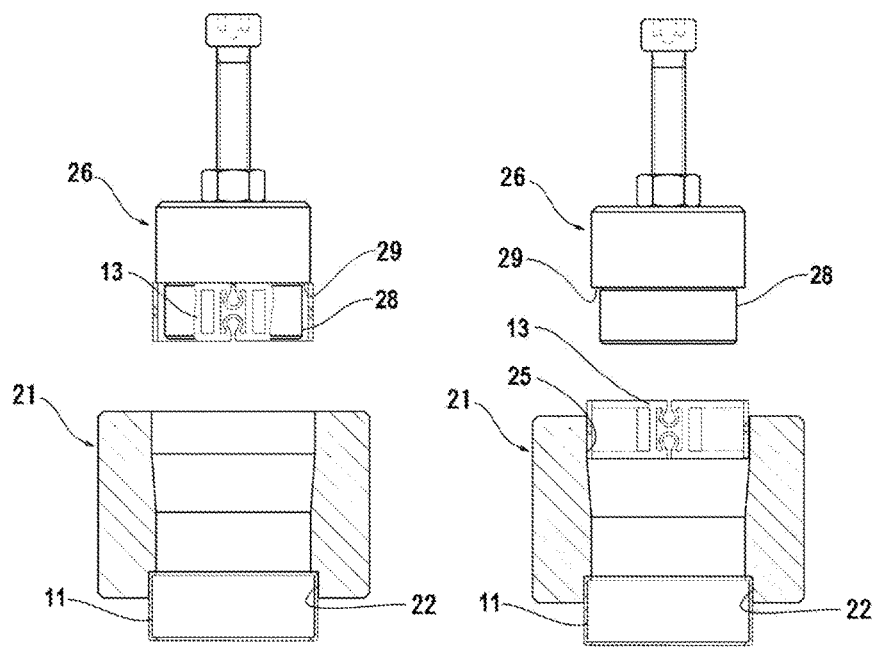
FIG. 9A illustrates an example of when the retainer is mounted on a male jig.
FIG. 9B illustrates an example of when the retainer is mounted on a female jig.
Figure 10:
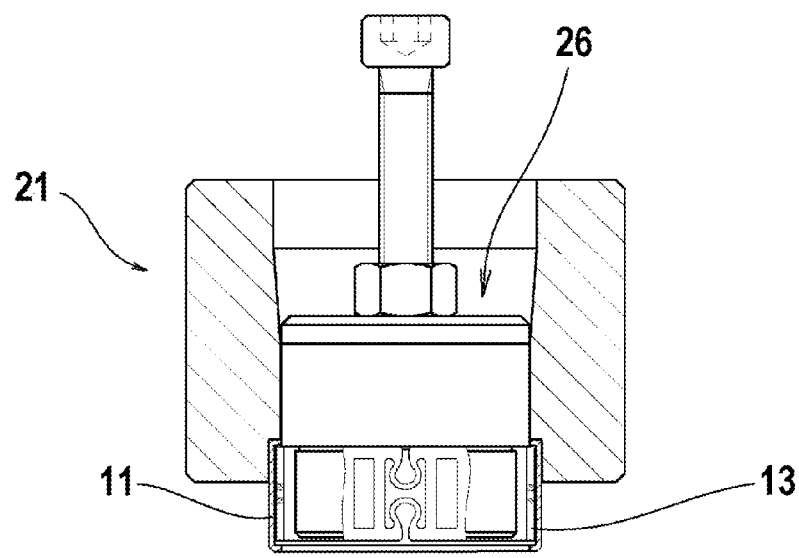
FIG. 10 is a view illustrating a state in which the retainer is assembled with the shell outer ring using the retainer insertion jigs.

When the retainer 13 is inserted into the shell outer ring 11, as illustrated in FIGS. 9A and 9B, the shell outer ring 11 is mounted in the shell outer ring-mounting stepped portion 22 of the female jig 21. As illustrated in FIG. 9A, the retainer 13 is mounted in the retainer mounting portion 28 of the male jig 26, or as illustrated in FIG. 9B, the retainer 13 is mounted in the retainer-mounting stepped portion 25 of the female jig 21. The male jig 26 is inserted into the female jig 21 from the retainer-mounting stepped portion 25 side of the female jig 21. The retainer 13 is axially pressed by the retainer pressing portion 29 of the male jig 26, and is pressed into the female jig 21 while the diameter of the retainer 13 is being reduced by the reduced diameter hole 24 of the female jig 21. At this time, the retainer mounting portion 28 of the male jig 26 backs up the retainer 13 such that the retainer 13 is prevented from being abnormally deformed. As illustrated in FIG. 10, when the retainer 13 is inserted into the inside of the shell outer ring 11, the diameter of the retainer 13 is restored to the original outer diameter ϕD1n, and the retainer 13 is prevented from falling off the shell outer ring 11.

The needles 12, 12 are respectively inserted into the pockets 14, 14 of the retainer 13 from the radial inside of the retainer 13. During the insertion operation, the needles 12 are respectively pressed into the pockets 14, 14 while the columnar portions 16, 16 and the radially inside locking protrusions 16a are elastically deformed, with both circumferential sides of the pockets 14, 14 being partitioned off by the columnar portions 16, 16, and the radially inside locking protrusions 16a being respectively formed on the side surfaces of the columnar portions 16, 16.

A circumferential width Wp between portions of the pocket 14 is greater than an outer diameter ϕDk of the needle 12 (Wp>ϕDk), in the portions deviating from the locking protrusions 16a, and thus the needle 12 is allowed to roll in the pocket 14 by a small force while being retained in the pocket 14. A gap Wi, which is between free-state tip edges of the pair of radially inside locking protrusions 16a, 16a that is present in radially inside opening portions of the pockets 14, 14, is smaller than the outer diameter ϕDk of the needle 12 (ϕDk>Wi). Accordingly, the needles 12 retained in the pockets 14, 14 are prevented from unexpectedly falling off the pockets 14, 14.

Hereinafter, another method of assembling the shell type needle roller bearing will be described. A retainer 18 is only the difference among the configuration elements of the shell type needle roller bearing. Due to the retainer 18, a different female jig 31 and a different male jig 36 are used.

Figure 11:
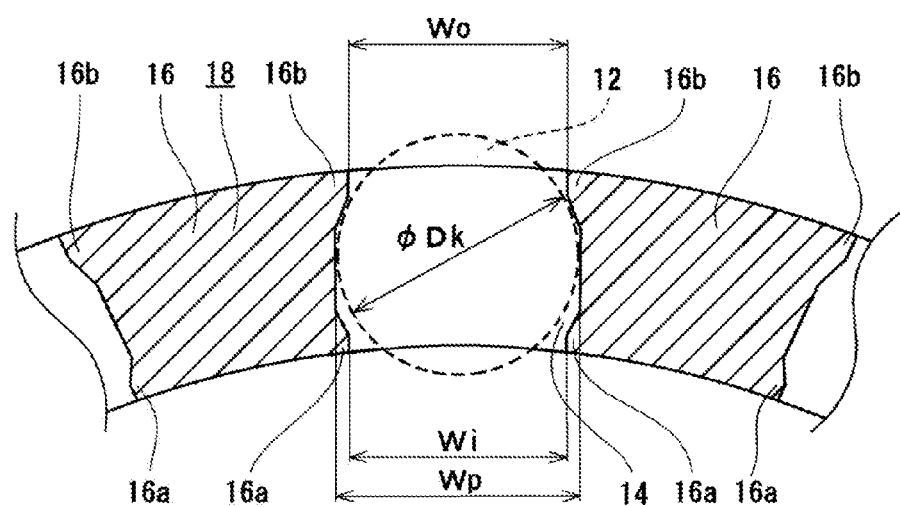
FIG. 11 is an axial sectional view of another retainer.

As illustrated in FIG. 3, the radially inside locking protrusions 16a, 16a are respectively formed in the diametrical inner end portions of the retainer 13 over the entire length of the columnar portions 16, 16, and on both the circumferential side surfaces of the columnar portions 16, 16. In contrast, as illustrated in FIG. 11, in addition to the radially inside locking protrusions 16a, 16a, radially outside locking protrusions 16b, 16b are respectively formed in outer end portions of the retainer 18 which is used in this assembly method over the entire length of the columnar portions 16, 16. The retainer 18 has the same configuration as the retainer 13 except that each portion has a different dimension, and a description will be given on the condition that the same reference signs are assigned to the same configuration elements.

First, the plurality of needles 12, 12 are respectively inserted into the pockets 14, 14 from the radial inside or the radial outside of the retainer 18. During the insertion operation, the needles 12 are respectively pressed into the pockets 14, 14 while the columnar portions 16, 16 and the radially inside locking protrusions 16a or the radially outside locking protrusions 16b are elastically deformed, with both the circumferential sides of the pockets 14, 14 being partitioned off by the columnar portions 16, 16, and the radially inside locking protrusions 16a or the radially outside locking protrusions 16b being respectively formed on the side surfaces of the columnar portions 16, 16. The circumferential width Wp between the portions of the pocket 14, 14 is greater than the outer diameter ϕDk of the needle 12 (Wp>ϕDk), in the portions deviating from the locking protrusions 16a, 16a, and thus the needle 12 is allowed to roll in the pocket 14 by a small force while being retained in the pocket 14. The gap Wi, which is between the free-state tip edges of the pair of radially inside locking protrusions 16a, 16a that is present in radially inside opening portions of the pockets 14, 14, and a gap Wo, which is between free-state tip edges of the pair of radially outside locking protrusions 16b, 16b that is present in the radially outside opening portions, are smaller than the outer diameter ϕDk of the needle 12 ϕDk>Wi and ϕDk>Wo). Accordingly, the plurality of needles 12, 12 retained in the pockets 14, 14 are prevented from unexpectedly falling off the pockets 14, 14.

As such, first, the plurality of needles 12, 12 are assembled with the retainer 18, and thereafter, similar to the retainer 13, the diameter of the retainer 18 is reduced, and the retainer 18 is assembled with the shell outer ring 11. For this reason, a sub-assembly obtained by assembling the plurality of needles 12, 12 into the retainer 18 is handled as a unit, and thus it is possible to increase the degree of freedom in the assembly step.

Figure 12A:
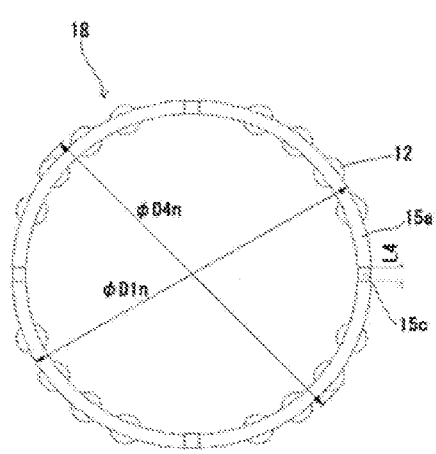
FIG. 12A is a view illustrating a retainer with which needles are assembled.
Figure 12B:
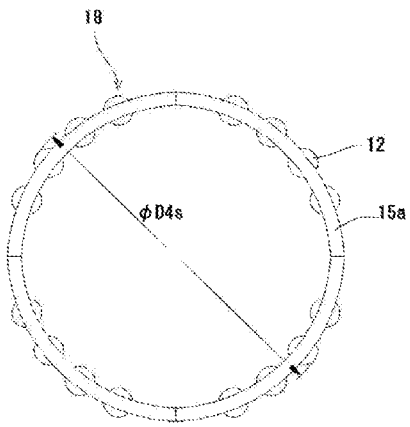
FIG. 12B is a view illustrating a state in which the diameter of the retainer having the needles assembled therewith is reduced due to elastic deformation.

As illustrated in FIGS. 6 and 7, the outer diameter $\phi D1n$ of the retainer 18 is greater than the flange-portion inner diameter $\phi D2$ of the shell outer ring 11. As illustrated in FIG. 12, a circumferential distance L4 of each of the slit 15c is reduced by deforming the elastic deformable portion 17, and as a result, the diameter of the retainer 18 can be circumferentially reduced. FIG. 12A is a view illustrating the retainer 18 with which the plurality of needles 12, 12 are assembled, and FIG. 12B is a view illustrating a state in which the diameter of the retainer 18 having the plurality of needles 12, 12 assembled therewith is reduced due to elastic deformation. The maximum outer diameter of the retainer 18 having the plurality of needles 12, 12 assembled therewith can be reduced up to an outer diameter $\phi D4s$ that is smaller than the flange-portion inner diameter $\phi D2$ of the shell outer ring 11.

The maximum outer diameter of the retainer 18 having the plurality of needles 12, 12 assembled therewith is reduced to be smaller than the flange-portion inner diameter $\phi D2$ of the shell outer ring 11, and the retainer 18 is inserted into the shell outer ring 11. After the insertion, the elastic deformable portions 17 is restored to the original state, and as a result, the retainer 18 is accommodated in the shell outer ring 11.

As illustrated in FIG. 8, retainer insertion jigs formed of the female jig 31 and the male jig 36 are used to reduce the diameter of the retainer 18 having the plurality of needles 12, 12 assembled therewith, and to insert the retainer 18 into the shell outer ring 11. As illustrated in FIG. 8, the female jig 21 is the same as the female jig 31, and the male jig 26 is the same as the male jig 36 except that each portion has a different dimension, and a description will be given on the condition that the same reference signs are assigned to the same configuration elements.

The shell outer ring-mounting stepped portion 22, in which the shell outer ring 11 can be mounted, is provided at one axial end (lower end in FIG. 8) of the female jig 31. The shell outer ring-mounting stepped portion 22 has a diameter slightly greater than the outer diameter $\phi D3$ of the shell outer ring 11, and is axially concave. A retainer-mounting stepped portion 35 is provided at the other axial end (upper end in FIG. 8) of the female jig 31. The retainer-mounting stepped portion 35 is coaxial with the shell outer ring-mounting stepped portion 22, and is axially concave. The diameter of the retainer-mounting stepped portion 35 is slightly greater than the maximum outer diameter $\phi D4n$ (refer to FIG. 12A) of the retainer 18 with which the plurality of needles 12, 12 are assembled, and thus it is possible to mount the retainer 18 with which the plurality of needles 12, 12 are assembled. The small-diameter hole 23 is provided on the inside end surface of the shell outer ring-mounting stepped portion 22. The small-diameter hole 23 is coaxial with the shell outer ring-mounting stepped portion 22, and has a diameter smaller than the flange-portion inner diameter $\phi D2$ of the shell outer ring 11. The small-diameter hole 23 is gradually connected to the retainer-mounting stepped portion 35 via a reduced diameter hole 34 with a tapered shape, the diameter of which increases from the small-diameter hole 23 toward the retainer-mounting stepped portion 35.

The male jig 36 includes the cylindrical body portion 27, and a retainer mounting portion 38 that is coaxial with the body portion 27, and protrudes toward one end side (lower side in FIG. 8) in the axial direction while being adjacent to the body portion 27. The body portion 27 is set to have a diameter slightly smaller than the small-diameter hole 23 of the female jig 31, and the body portion 27 can be inserted into the small-diameter hole 23. The retainer mounting portion 38 is formed to have a diameter that is slightly smaller than a diameter obtained by subtracting two times the outer diameter $\phi Dk$ (refer to FIG. 11) of the needle 12 from the diameter of the small-diameter hole 23. A stepped portion between the body portion 27 and the retainer mounting portion 38 serves as a retainer pressing portion 39 that is a flat surface perpendicular to the axial direction (flat surface perpendicular to the axis). The pressing shaft 20 is provided on the body portion 27 side (the other end side in the axial direction and the upper side in FIG. 8) of the male jig 36, with the body portion 27 side being opposite to the retainer mounting portion 38. When the male jig 36 is inserted into the female jig 31, the pressing shaft 20 transmits an axial pressing force from a hand or a machine toward the male jig 36. The shape of the pressing shaft 20 may be selected so as to allow the pressing shaft 20 to be easily gripped by an operator, or to be easily attached to a machine, and the pressing shaft 20 does not necessarily have the shape illustrated in FIG. 8.

Figures 13A, 13B:
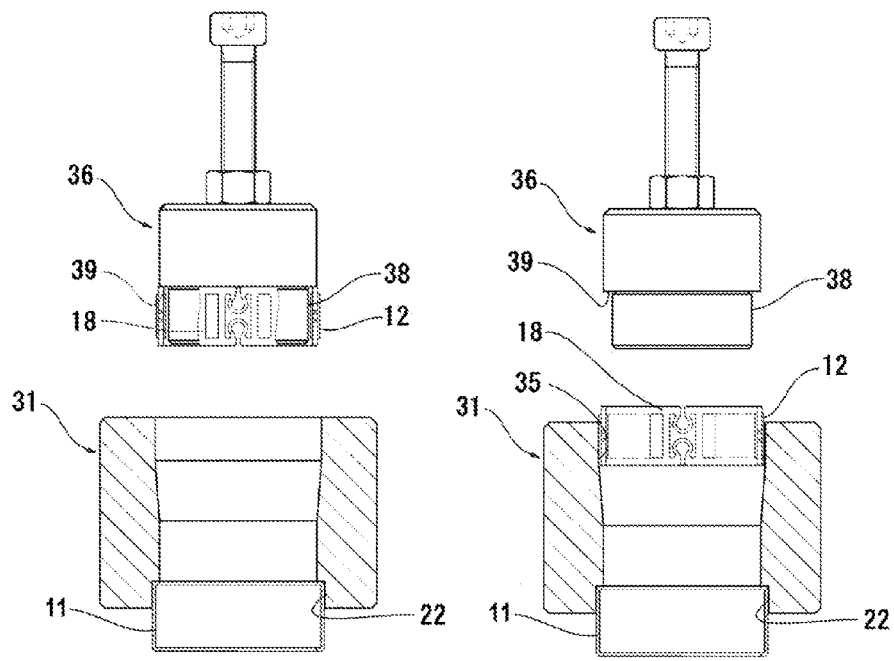
FIG. 13A illustrates an example of when the retainer having the needles assembled therewith is mounted on the male jig.
FIG. 13B illustrates an example of when the retainer is mounted on the female jig.
Figure 14:
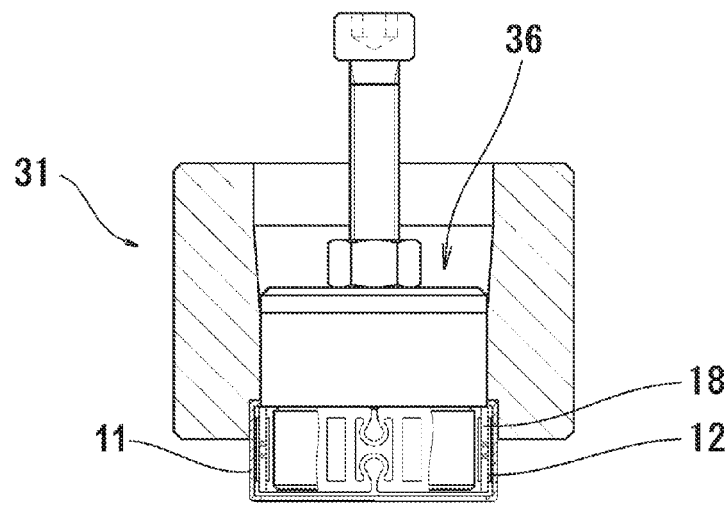
FIG. 14 is a view illustrating a state in which the retainer having the needles assembled therewith is assembled with the shell outer ring using the retainer insertion jigs.
Figure 15:
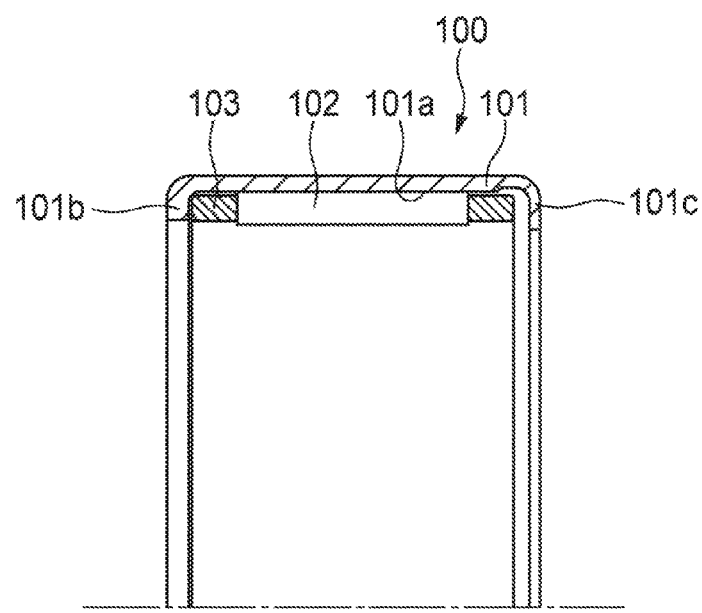
FIG. 15 is a sectional view illustrating a shell type needle roller bearing in the related art.

When the retainer 18 is inserted into the shell outer ring 11, as illustrated in FIGS. 13A and 13B, the shell outer ring 11 is mounted in the shell outer ring-mounting stepped portion 22 of the female jig 31. The retainer 18 having the plurality of needles 12, 12 assembled therewith is mounted in the retainer-mounting stepped portion 35 of the female jig 31, or is mounted in the retainer mounting portion 38 of the male jig 36. The male jig 36 is inserted into the female jig 31 from the retainer-mounting stepped portion 35 side of the female jig 31. The retainer 18 is axially pressed by the retainer pressing portion 39 of the male jig 36, and is pressed into the female jig 31 while the diameter of the retainer 18 is being reduced by the reduced diameter hole 34 of the female jig 31. At this time, the retainer mounting portion 38 of the male jig 36 backs up the retainer 18 such that the retainer 18 is prevented from being abnormally deformed. As illustrated in FIG. 14, when the retainer 18 is inserted into the inside of the shell outer ring 11, the diameter of the retainer 18 is restored to the original outer diameter $\phi D1n$, and the retainer 8 is prevented from falling off the shell outer ring 11.

The retainers 13 and 18 are made of resin, and the following resin can be used as the material of the retainers 13 and 18: polyamide (nylon resin) such as aromatic polyamide (aromatic PA), polyamide 46, polyamide 6, polyamide 66; fluororesin such as polyphenylene sulfide (PPS), polyetheretherketone (PEEK), polyacetal (POM), polytetrafluoroethylene (PTFE); and the like. Preferably, it is possible to use any one of the aforementioned resin in which a reinforcement such as glass fiber or carbon fiber is mixed. More preferably, 5% by weight to 30% by weight of glass fiber or carbon fiber may be mixed in the polyamide resin, and thus bending elastic modulus may be set to 2000 MPa to 5000 MPa. When the bending elastic modulus is within this range, more preferably, the deformable portion is capable of having deformability and necessary rigidity.

In the embodiment, the radially inside locking protrusion 16a and the radially outside locking protrusion 16b are formed over the entire length of each of the columnar portions 16, 16; however, the radially inside locking protrusion 16a and the radially outside locking protrusion 16b may be provided only in a range shorter than the entire length, or may be provided while being divided into a plurality of pieces.

As described above, in the shell type needle roller bearing 10 in the embodiment, the plurality of elastic deformable portions 17 are circumferentially provided in each of the retainers 13 and 18 so as to allow each of the retainers 13 and 18 to circumferentially contract, and the elastic deformable portion 17 is formed symmetrical relative to the axial center portion C. Therefore, it is possible to provide the retainers 13 and 18 which are prevented from undergoing plastic deformation, have sufficient strength against axial twist, and are capable of circumferentially contracting while a sufficient amount of deformation is ensured. The motion of the needle 12 is appropriately allowed, and the fretting of the needle 12 can be prevented by the elastic deformable portion 17.

Each of the pair of rim portions 15, 15 is formed of the plurality of arc-shaped portions 15a. The plurality of slits 15c are formed in the pair of rim portions 15, 15 while being positioned at the same circumferential phase, and each of the slits 15c is formed between the end portions 15b of the arc-shaped portions 15a that are circumferentially adjacent to each other. The elastic deformable portion 17 includes the pair of elastic deformable pieces 17a, 17a, portions of which respectively extend axially inwards from the end portions 15b of the arc-shaped portions 15a circumferentially adjacent to each other, and the extended portions of which are connected together in the circumferential direction. Accordingly, it is possible to form the elastic deformable portion 17 that is symmetrical relative to the axial center portion C.

The elastic deformable portion 17 is formed between the columnar portions 16, 16 adjacent to each other in the circumferential direction, and the circumferential distance L1 of the slit 15c is smaller than the sum of the circumferential distances L2 between the columnar portions 16 and the elastic deformable pieces 17a adjacent to each other. Therefore, it is possible to ensure a sufficient amount of deformation without the columnar portion 16 coming into contact with the elastic deformable piece 17a before the slit 15c disappears when the elastic deformable portion 17 circumferentially contract.

Since either the retainer 13 or the retainer 18, and the needles 12 are assembled with the shell outer ring 11 after both the flange portions 11b and 11c of the shell outer ring 11 are formed, and a heat treatment is applied to the shell outer ring 11, the plating step in the related art is not required, and the retainer is not thermally affected by the heat treatment. Therefore, resin can be used as the material of the retainers 13 and 18.

The present invention is not limited to the aforementioned embodiment, and modifications, improvements, or the like can be appropriately made to the embodiment.

This application is on the basis of Japanese Patent Application No. 2013-174526, filed on Aug. 26, 2013, the content of which is incorporated herein for reference.

INDUSTRIAL APPLICABILITY

As described above, according to the method of manufacturing a shell type needle roller bearing and the assembly jigs of the present invention, after both the flange portions of the shell outer ring are formed and a heat treatment is applied to the shell outer ring, the retainer and the needles are assembled with the shell outer ring, and thus a plating step, which has been required in the related art, is not required, and the retainer is not thermally affected by the heat treatment. Therefore, resin can be used as the material of the retainer, and this manufacturing method can be preferably adopted as a method of manufacturing a shell type needle roller bearing used in rotation support portions of various pieces of machinery.

DESCRIPTION OF REFERENCE NUMERALS

10: SHELL TYPE NEEDLE ROLLER BEARING, 11: SHELL OUTER RING, 11a: RACEWAY SURFACE, 11b: FLANGE PORTION, 11c: FLANGE PORTION, 12: NEEDLE, 13: RETAINER, 14: POCKET, 15: RIM PORTION, 15a: ARC-SHAPED PORTION, 15b: END PORTION, 15c: SLIT, 16: COLUMNAR PORTION, 16a: RADIALLY INSIDE LOCKING PROTRUSION, 16b: RADIALLY OUTSIDE LOCKING PROTRUSION, 17: ELASTIC DEFORMABLE PORTION, 17a: ELASTIC DEFORMABLE PIECE, 17a1: ARC, 17a2: ARC, 17a3: ARC, 18: RETAINER, 20: PRESSING SHAFT, 21: FEMALE JIG, 22: SHELL OUTER RING-MOUNTING STEPPED PORTION, 23: SMALL-DIAMETER PORTION, 24: REDUCED DIAMETER HOLE, 25: RETAINER-MOUNTING STEPPED PORTION, 26: MALE JIG, 27: BODY PORTION, 28: RETAINER MOUNTING PORTION, 29: RETAINER PRESSING PORTION, 31: FEMALE JIG, 34: REDUCED DIAMETER HOLE, 35: RETAINER-MOUNTING STEPPED PORTION, 36: MALE JIG, 38: RETAINER MOUNTING PORTION, 39: RETAINER PRESSING PORTION, 100: SHELL TYPE NEEDLE ROLLER BEARING, 101: SHELL OUTER RING, 101a: RACEWAY SURFACE, 101b: FLANGE PORTION, 101c: FLANGE PORTION, 102: NEEDLE, 103: RETAINER

The invention claimed is:

1. A method of manufacturing a shell type needle roller bearing including a shell outer ring having an inner circumferential raceway surface and a pair of inward flange portions in both end portions of the shell outer ring; a plurality of needles that are disposed in the shell outer ring in such a way as to be capable of rolling along the raceway surface of the shell outer ring; and a retainer having a plurality of pockets for retaining the plurality of needles, wherein the diameter of the retainer can be reduced, wherein after both the flange portions of the shell outer ring are formed and a heat treatment is applied to the shell outer ring, the diameter of the retainer is reduced to a diameter smaller than a flange-portion inner diameter of the shell outer ring, the retainer is inserted into the shell outer ring using a retainer insertion jig, and then the plurality of needles are respectively inserted into the pockets of the retainer, wherein the retainer insertion jig is formed of a female jig and a male jig, wherein a shell outer ring-mounting stepped portion, in which the shell outer ring can be mounted, is provided at one axial end of the female jig, has a diameter greater than the outer diameter of the shell outer ring, and is axially concave, wherein a retainer-mounting stepped portion, in which the retainer can be mounted, is provided at the other axial end of the female jig, is coaxial with the shell outer ring-mounting stepped portion, has a diameter greater than the outer diameter of the retainer, and is axially concave, wherein a small-diameter hole is provided on an inside end surface of the shell outer ring-mounting stepped portion, is coaxial with the shell outer ring-mounting stepped portion, and has a diameter smaller than the flange-portion inner diameter of the shell outer ring, wherein the small-diameter hole is gradually connected to the retainer-mounting stepped portion via a reduced diameter hole with a tapered shape, the diameter of which increases from the small-diameter hole toward the retainer-mounting stepped portion, wherein the male jig includes a body portion which has a diameter smaller than that of the small-diameter hole of the female jig such that the body portion can be inserted into the small-diameter hole, and a retainer mounting portion that is coaxial with the body portion, protrudes in an axial direction while being adjacent to the body portion, and has a diameter that is smaller than a diameter obtained by subtracting two times the radial thickness of the retainer from the diameter of the small-diameter hole, wherein a stepped portion between the body portion and the retainer mounting portion serves as a retainer pressing portion that is a flat surface perpendicular to the axis, and wherein when the retainer is inserted into the shell outer ring, the shell outer ring is mounted in the shell outer ring-mounting stepped portion of the female jig, the retainer is mounted in the retainer mounting portion of the male jig, or in the retainer-mounting stepped portion of the female jig, and the male jig is inserted into the female jig from the retainer-mounting stepped portion side of the female jig, and thus the retainer is inserted into the shell outer ring.

\* \* \* \* \*